United States Patent
Olsen et al.

(10) Patent No.: US 7,351,391 B1
(45) Date of Patent: Apr. 1, 2008

(54) SYSTEM AND METHOD FOR CONVERTING THE SPENT REMNANTS OF A FIRST PICKLING ACID SOLUTION INTO A USABLE SECOND PICKLING ACID SOLUTION

(76) Inventors: Douglas R. Olsen, 228 N. Quaker Hill, Pawling, NY (US) 12564; Charles D. Blumenschein, 905 Ruth St., Pittsburgh, PA (US) 15243

( * ) Notice: Subject to any disclaimer, the term of this patent is extended or adjusted under 35 U.S.C. 154(b) by 296 days.

(21) Appl. No.: 11/129,639

(22) Filed: May 16, 2005

Related U.S. Application Data

(60) Continuation-in-part of application No. 10/245,418, filed on Sep. 17, 2002, now abandoned, which is a division of application No. 09/740,465, filed on Dec. 19, 2000, now abandoned.

(51) Int. Cl.
  *C01B 7/07* (2006.01)
  *C01B 17/90* (2006.01)
  *C01G 49/00* (2006.01)
  *C23G 1/02* (2006.01)

(52) U.S. Cl. .................. 423/488; 423/146; 423/522; 423/531; 423/558; 423/DIG. 1; 423/DIG. 2; 134/3

(58) Field of Classification Search .............. 423/488, 423/588, 522, 531, 146, DIG. 1, DIG. 2, 423/558; 134/3
See application file for complete search history.

(56) References Cited

U.S. PATENT DOCUMENTS

| | | | | |
|---|---|---|---|---|
| 3,635,664 A | * | 1/1972 | Morimoto | .................. 423/146 |
| 3,928,529 A | * | 12/1975 | Grulke | ........................ 423/138 |
| 4,222,997 A | | 9/1980 | Beecher | ....................... 423/481 |
| 4,382,916 A | | 5/1983 | Beecher | ........................ 423/481 |
| 4,436,681 A | | 3/1984 | Barczak et al. | ............... 264/67 |
| 5,401,485 A | * | 3/1995 | Hamilton, Jr. | .............. 423/632 |
| 5,417,955 A | * | 5/1995 | Connolly | ..................... 423/488 |
| 6,676,917 B2 | * | 1/2004 | Cabello-Fuentes | .......... 423/482 |
| 7,097,816 B2 | * | 8/2006 | Kehrmann | ................... 423/146 |

FOREIGN PATENT DOCUMENTS

| DE | 4122920 | 1/1993 |
|---|---|---|
| JP | 10130026 | 5/1998 |

OTHER PUBLICATIONS

The English translation of DE 41 22 920 A1 published on Jan. 14, 1993.*

* cited by examiner

*Primary Examiner*—Timothy C. Vanoy
(74) *Attorney, Agent, or Firm*—Lamorte & Associates P.C.

(57) ABSTRACT

A system and method of economically converting a spent first pickling acid solution that contains hydrochloric acid, water and ferrous chloride into a suitable second pickling solution. Sulfuric acid is added to the first pickling acid solution. This produces a regeneration solution. In the regeneration solution, the sulfuric acid reacts with said ferrous chloride and water to produce ferrous sulfate heptahydrate and hydrochloric acid. The regeneration solution is cooled to promote precipitation of the ferrous sulfate heptahydrate from the regeneration solution, therein creating ferrous sulfate heptahydrate crystals and a second pickling acid solution. The second pickling acid solution contains both hydrochloric acid and sulfuric acid. The ferrous sulfate heptahydrate crystals are separated from second pickling solution. The ferrous sulfate heptahydrate is sold commercially and the second pickling acid solution is used to directly pickle ferrous metal.

13 Claims, 2 Drawing Sheets

SYSTEM AND METHOD FOR CONVERTING THE SPENT REMNANTS OF A FIRST PICKLING ACID SOLUTION INTO A USABLE SECOND PICKLING ACID SOLUTION

RELATED APPLICATIONS

This application is a continuation in part of U.S. patent application Ser. No. 10/245,418 filed Sep. 17, 2002, now abandoned, entitled Regenerating spent pickle liquor, which was a divisional of U.S. patent application Ser. No. 09/740,465 filed Dec. 19, 2000, now abandoned also entitled Regenerating spent pickle liquor.

BACKGROUND OF THE INVENTION

1. Field of the Invention

In general, the present invention relates to systems and methods that are used to regenerate spent acids. More particularly, the present invention relates to systems and methods that are used to regenerate acids used in the pickling of metal.

2. Description of Prior Art

In the manufacturing of metal products, the process of pickling is the immersion of the metal into an acid bath. The acid bath removes the scale, oxides, and other impurities from the metal surface.

When ferrous metals, such as steel, are pickled, the pickling acid is typically hydrochloric acid. As the ferrous metal is pickled, the hydrochloric acid reacts with the ferrous metal and becomes spent. In a typical pickling reaction, where steel is pickled in hydrochloric acid, the hydrochloric acid reacts with iron oxides on the steel to produce ferrous chloride. As ferrous chloride is produced, the hydrochloric acid is consumed. Thus, as pickling continues, the pickling acid bath contains less and less hydrochloric acid and more and more ferrous chloride. Eventually, the pickling acid bath becomes so diluted that it becomes ineffective. In the pickling of steel, it is commonly accepted that iron salts, such as ferrous chloride, should be in solution at a concentration less than 12 gms/100 ml for the acid bath to be considered effective.

Once an acid bath become ineffective, the acid bath must be replaced. Spent acid baths are known in the industry as "spent pickle liquor". Traditionally spent pickle liquor has been disposed of by being sent to a water treatment facility for neutralization or by being injected and forgotten in deep wells. An alternative to disposal, however, is regeneration. In a regeneration process, a chemical reaction is performed on the ferrous chloride in the spent pickle liquor to regenerate hydrochloric acid. The hydrochloric acid is then separated from the by-products so that it can be reused.

In the steel industry today, the dominant form or acid regeneration is roasting. During roasting, spent pickle liquor is boiled. The hydrochloric acid can therein be vaporized and separated from the by-products by distillation. However, thousands of gallons of spent pickle liquor are produced in steel mills every day. This large volume of spent pickle liquor must then be transported to a roasting facility. Once at the roasting facility, the spent pickle liquor must be heated to the high temperatures needed for distillation. The costs of fossil fuels are at record highs. Thus, the cost of both transportation and roasting have risen dramatically and some steel companies believe that regeneration have become cost prohibitive.

Furthermore, during the pickling of metal, various inhibitor compounds are added to the pickling baths. The inhibitor compounds help protect the base metal from reacting with the acid, while allowing the scale and oxides to dissolve. Some inhibitor compounds actually increase the reaction of the acid to the scale and prevent entrainment of the acid into the atmosphere.

During the roasting of spent pickle liquor, only hydrochloric acid is recovered. The inhibitor compounds are not recycled and are lost. The inhibitors must therefore be again added to the recovered acid before the recovered acid can be used in a pickling bath.

In the prior art, typical roasting techniques are disclosed in U.S. Pat. No. 4,382,916, to Beecher, entitled Method Of Preparing Hydrochloric Acid And High Purity Ferrous Sulfate Hydrate Crystals From Hydrochloric Acid Waste, and U.S. Pat. No. 4,222,997, to Beecher, entitled Method Of Recovering Hydrochloric Acid From Spent Hydrochloric Acid Pickle Waste. In such prior art techniques, hydrochloric acid is boiled under pressure. Hydrochloric acid is recovered by condensing vapors to remove hydrochloric acid and water.

In U.S. Pat. No. 4,436,681 to Barczak, entitled process For Producing Iron Oxide Weighting Material From Iron Chloride Solutions, hydrochloric acid is recovered from spent pickle liquor by injecting the pickle liquor into a roasting chamber at very high temperatures. The ferrous chloride is converted to $Fe_2O_3$ and HCl. The roasting process uses a great deal of energy and requires high maintenance costs. The $Fe_2O_3$ produced is of low marginal quality and commercial value.

Some spent pickle liquor regeneration techniques other than roasting have been explored. It has been discovered that if sulfuric acid is mixed with a spent pickling liquid of hydrochloric acid, hydrogen chloride gas is produced. This gas can be distilled out at high temperature in a procedure very similar to roasting. However, by applying a vacuum to the reaction chamber, high roasting temperatures need not be used. Rather, by reacting spent pickle liquor with sulfuric acid in a vacuum chamber, the hydrogen chloride can be recovered at only moderately elevated temperatures. Such recovery techniques are disclosed in German patent Application No. DE 4122920 A1 to Czarnowski, entitled A Method for Regenerating Pickling Liquor; and Japanese Patent Publication No. 10-130026 to Nobuyoshi Yatomi, entitled Processing Method Of Hydrochloric Acid Discard.

Although the spent pickle liquor need not be roasted, it still must be heated in a vacuum chamber. Such facilities are highly sophisticated and are impractical to create at a steel mill. Consequently, the spent pickle liquor must be transported to specialized recovery facilities. The recaptured hydrochloric acid must then be transported back to the steel mill for use. It is the storage and transportation of this hazardous material that causes such regeneration processes to be economically unattractive.

Another disadvantage of the vacuum chamber regeneration method is that once the hydrogen chloride gas is extracted, a muck of sulfuric acid and ferrous sulfate is left over. The sulfuric acid can be separated from the ferrous sulfate in a secondary procedure, but then the used sulfuric acid is left over. The sulfuric acid can be separately transported to a steel mill for reuse, however eventually it must be disposed. The problem and cost of disposing a hazardous waste is therefore not eliminated by the regeneration process, thereby undermining the primary incentive to use a regenerating process.

Yet another disadvantage of vacuum chamber regeneration techniques is that the inhibitor compounds added to the pickle liquor are not recycled and are lost. Additional inhibitor compounds must then be added to the regenerated hydrochloric acid before it can be used in pickling. This adds significantly to the cost of recycling the pickle liquor.

A need therefore exists in the art for a regenerating process for spent pickle liquor that does not require high temperature, yet produces no waste acids that require deposal. A need also exists for a method of regenerating spent pickle liquor on-site so that the costs of transporting and storing hazardous wastes can be eliminated. A need also exists for a regeneration process that recycles the inhibitor compounds added to the pickling liquor so that expensive new inhibitor compounds do not have to be constantly added. These needs are met by the present invention as described and claimed below.

SUMMARY OF THE INVENTION

The present invention is a system and method of economically converting a spent first pickling acid solution that contains hydrochloric acid, water and ferrous chloride into a suitable second pickling solution. In accordance with the present invention, sulfuric acid is added to the first pickling acid solution. This produces a regeneration solution. In the regeneration solution, the sulfuric acid reacts with said ferrous chloride and water to produce ferrous sulfate heptahydrate and hydrochloric acid. The regeneration solution is cooled to promote precipitation of the ferrous sulfate heptahydrate from the regeneration solution, therein creating ferrous sulfate heptahydrate crystals and a second pickling acid solution. The second pickling acid solution contains both hydrochloric acid and sulfuric acid.

The ferrous sulfate heptahydrate crystals are separated from second pickling solution. The ferrous sulfate heptahydrate is sold commercially and the second pickling acid solution is used to directly pickle ferrous metal.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
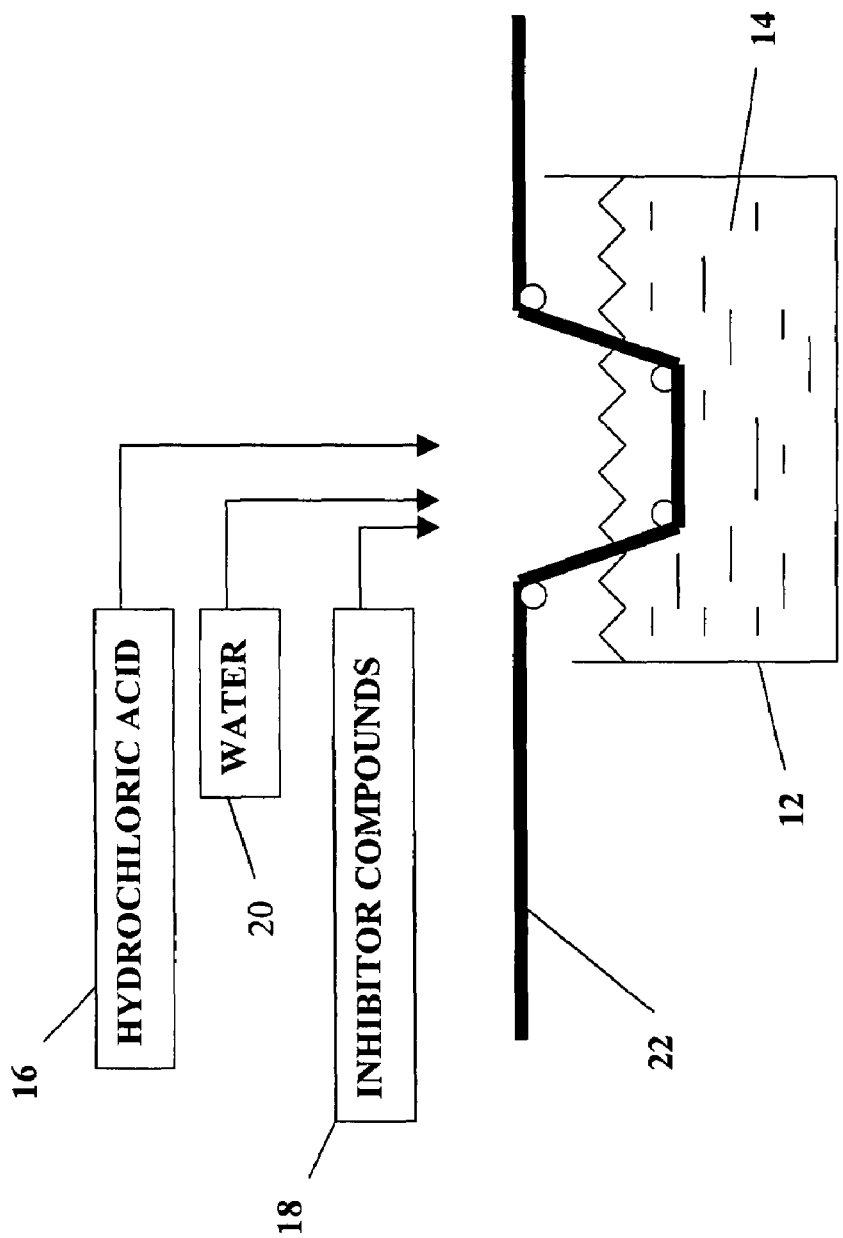
FIG. 1 is a schematic of a typical pickling process that produces spent pickle liquor.

Referring to FIG. 1, there is shown a schematic of a traditional pickling process, such as that used in a commercial steel mill. A pickling tank 12 is initially filled with a first pickling acid solution 14. The first pickling acid solution 14 is a hydrochloric acid solution that contains hydrochloric acid 16, inhibitor compounds 18 and water 20. The inhibitor compounds 18 are usually a cocktail of organic acids that are custom designed for the particular type of metal being pickled. The inhibitor compounds help prevent the first pickling acid solution 14 to react only with the scale that is on the metal, and not the base metal itself. The inhibitor compounds 18 add significantly to the cost of the pickling solution.

A ferrous metal 22, such as steel, is then introduced into the pickling tank 12. Once the ferrous metal 22 is introduced into the pickling tank 12, a reaction occurs between the iron oxide scale on the ferrous metal 22 and the hydrochloric acid 16 in the first pickling acid solution 14. The reaction of various iron oxides with the hydrochloric acid 16, to produce ferrous chloride as is shown by the following chemical reaction formulas.

$$Fe_2O_3 + Fe + 6HCl = 3FeCl_2 + 3H_2 \qquad \text{Equation 1}$$

$$Fe_3O_4 + Fe + 8HCl = 4FeCl_2 + 4H_2O \qquad \text{Equation 2}$$

$$FeO + 2HCl = H_2O + FeCl_2 \qquad \text{Equation 3}$$

All of the reactions listed above react ferrous oxides with hydrochloric acid 16 causing a depletion in the hydrochloric acid 16 and the production of ferrous chloride. Consequently, as ferrous metal 22 is pickled in the pickling tank 12, the amount of hydrochloric acid 16 in the first pickling acid solution 14 decreases and the amount of ferrous chloride in the first pickling acid solution 14 increases. Eventually, the first pickling acid solution 14 reaches a dilution where it is unsuitable for pickling. The result. The first pickling acid solution 14 is converted into a volume of spent pickle liquor, containing high concentrations of ferrous chloride and low concentrations of hydrochloric acid.

Figure 2:
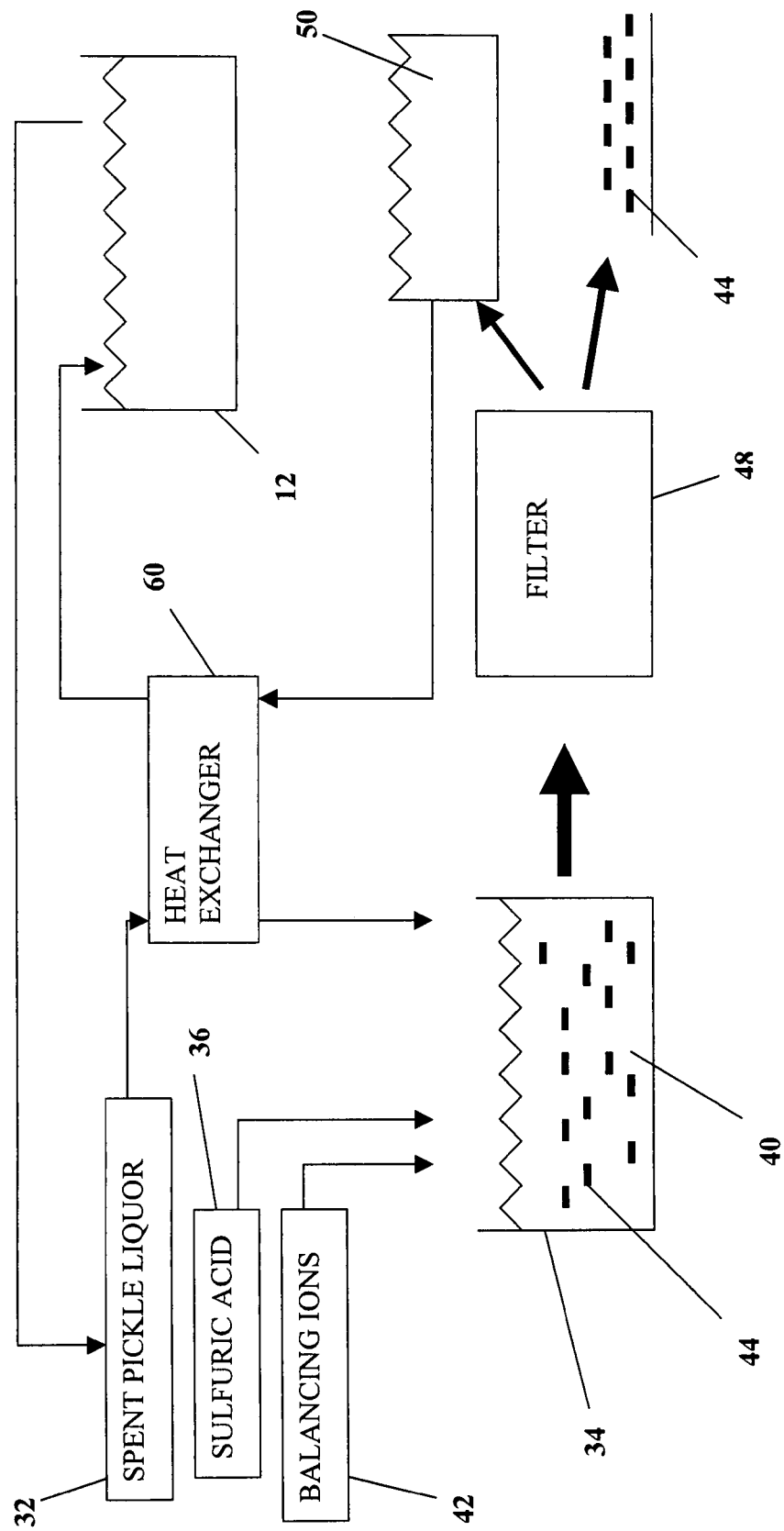
FIG. 2 is a schematic of the regeneration process in accordance with the present invention.

Referring to FIG. 2, a schematic of the present invention system 30 is shown that converts the spent pickle liquor 32 into a usable pickling acid. The system 30 starts out by receiving a volume of spent pickle liquor 32, such as was created in the methodology set forth in FIG. 1. The spent pickle liquor 32 is a solution having low concentrations of hydrochloric acid and high concentrations of ferrous chloride.

The spent pickle liquor 32 is introduced into a chilled reaction chamber 34. Sulfuric acid 36 is then mixed with the spent pickle liquor 32 within the chilled reaction chamber 34. This produces a regeneration solution 40. At ambient pressure, the regeneration solution 40 is cooled to a reaction temperature range. The reaction temperature range is preferably between 30 degrees Fahrenheit and 45 degrees Fahrenheit.

Once within the reaction temperature range, the sulfuric acid 36 is given time to react with the ferrous chloride in the spent pickle liquor 32 to produce ferrous sulfate and hydrochloric acid, as shown by the following chemical reaction formula.

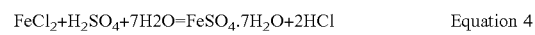

$$FeCl_2 + H_2SO_4 + 7H_2O = FeSO_4 \cdot 7H_2O + 2HCl \qquad \text{Equation 4}$$

From Equation 4, it can be seen that the ferrous sulfate combines with water to form ferrous sulfate heptahydrate. To optimize the reaction of Equation 4, it is preferred to balance the ions of sulfuric acid, hydrochloride ions, sulfate ions, and iron ions. Thus, balancing ion 42 can be added to the regeneration solution 40. It has been determined that the present invention methodology operates to break weakly associated $FeCl_2$ and form strongly associated $FeSO_4$, if the regeneration solution 40 is kept both ionically balanced and within the stated reaction temperature range.

When the regeneration solution 40 is kept within the cool reaction temperature range, the oxidation of $Fe_2^+$, $Fe_3^-$, and $Fe_3^+$ ions are minimized. The production of ferrous oxides is therefore suppressed. The free iron ions then form ferric sulfate with sulfuric acid rather than ferrous chloride with the hydrochloric acid.

Ferrous sulfate has a lower solubility in hydrochloric acid than does ferrous chloride. As result, the ferrous sulfate precipitates out of solution at the chilled reaction temperatures. As the ferrous sulfate crystallizes into ferrous sulfate heptahydrate, the crystallization process removes both the iron and the sulfates from the regeneration solution 40. The result is that the regeneration solution 40 now contains a high concentration of hydrochloric acid, a low concentration of sulfuric acid and solid crystals of ferrous sulfate heptahydrate 44.

To optimize the crystallization of the ferrous sulfate heptahydrate, the regeneration solution 40 can be gradually lowered to a temperature below that of reaction temperature range and above that which causes the water in the regeneration solution 40 to freeze. The lower temperature range can reach zero degrees Fahrenheit. If the regeneration solution 40 is kept too hot, not all the ferrous sulfate will precipitate out of solution, and too much iron will be left in solution. If too cold, ice crystals will form and dilute the ferrous sulfate heptahydrate by-product.

Although the crystals of ferrous sulfate heptahydrate 44 do precipitate out of solution at the cooled temperatures, crystallization can be improved by the addition of other substances that lower the solubility of the ferrous sulfate in the regeneration solution 40. For example, the addition of sulfate ions decreases the solubility of ferrous sulfate. Accordingly, sulfate ions, for example, in the form of sodium sulfate, can be added to the solution to improve crystallization. Sulfate ions also are introduced by adding greater than the stoichiometric amount of sulfuric acid, or by maintaining a residual level of sulfate ions in the regeneration solution 40.

After the ferrous sulfate heptahydrate crystals 44 have had time to precipitate out of the regeneration solution 40, the ferrous sulfate heptahydrate crystals 44 are then separated from the regeneration solution 40. There are many methods of cold filtering. A centrifuge filtering process is particularly effective. By introducing the regeneration solution 40 into a centrifuge filter 48 the ferrous sulfate heptahydrate crystals 44 can be efficiently separated from the remaining solution.

After separation, there is produced a volume of ferrous sulfate heptahydrate crystals 44 and a volume of a second pickling acid solution 50. The second pickling acid solution 50 contains a high concentration of hydrochloric acid and a low concentration of sulfate ions. Most of the iron was removed by conversion into ferrous sulfate heptahydrate crystals. However, the second pickling acid solution 50 still contains at least some of the organic acid inhibitor compounds 18 that were added to the original pickling acid solution 14.

The second pickling acid solution 50 is introduced into a pickling process and is used directly to pickle metal. When the second pickling acid solution 50 is used as the primary pickling acid, certain benefits occur. The solubility of ferrous sulfate in the second pickling acid solution 50 is depressed so that additional ferrous sulfate is more readily crystallized and removed during subsequent regeneration cycles.

The second pickling acid solution 50, since it contains both sulfuric acid and hydrochloric acid pickles many types of metal better than does a hydrochloric acid solution alone. The hydrochloric acid in the second pickling acid solution 50 attempts to dissolve all the scale present on the metal. The sulfuric acid in the second pickling acid solution 50 dissolves principally the ferrous oxide (FeO) fractions of the scale. Sulfuric acid penetrates the scale by acting on the base metal, generating hydrogen which acts to pop off the unreacted scale of miscellaneous oxides. Thus, the second pickling acid solution 50 produces metal with less scale than does a pickling solution of hydrochloric acid alone.

Since the second pickling acid solution 50 contains both hydrochloric acid and sulfuric acid. The sulfuric acid replaces an equivalent amount of hydrochloric acid. This lowers the vapor pressure of hydrogen chloride emitted by the pickling tank 12.

In an example of a reduction of the hydrochloric acid by 2%, replacing the acid value by sulfuric acid, there is a reduction of vapor pressure of hydrogen chloride over the range of the pickling tank of an average of 50%. This causes the loss of hydrogen chloride vapor to the scrubbing system to be reduced by 45-50%, thereby saving considerable loss of hydrochloric acid. Losses from vaporization are dropped from 10% to 5% of the HCl returned to the pickling tank 12.

To further save energy in the system 30, the spent pickle liquor 32 and the second pickling acid solution 50 can be passed through a heat exchanger 60. The spent pickle liquor 32 is warm and needs to be cooled for regeneration. The second pickling acid solution 50 is cool and needs to be warmed before it can be used to pickle metal. By providing a heat exchanger 60, excess heat from the spent pickle liquor 32 can be transferred to the second pickling acid solution 50.

Although the initial pickling solution described in the methodology contained hydrogen chloride, it will be understood that the present invention regeneration process can work on other pickling solutions, including those that combine hydrochloric acid with nitric acid, hydrofluoric acid, or a halogen acid.

It will also be understood that the embodiments of the present invention that are illustrated and described are only exemplary and that a person skilled in the art can vary the system using functionally equivalent components that have not been described. For example, the centrifuge filter can be replaced with other cold filtering systems. The various tanks can also be altered to have any volume and shape. All such modifications, variations and alternate embodiments are intended to be included within the scope of the present invention as defined by the claims.

What is claimed is:

1. A method of converting a spent first pickling acid solution that contains hydrochloric acid, water and ferrous chloride into a second pickling acid solution, said method comprising the steps of:
   adding sulfuric acid to said spent first pickling acid solution to produce a regeneration solution, wherein said sulfuric acid reacts with said ferrous chloride and water while at ambient pressure to produce ferrous sulfate heptahydrate and hydrogen chloride;
   cooling said regeneration solution to promote precipitation of said ferrous sulfate heptahydrate from said regeneration solution, therein creating ferrous sulfate heptahydrate crystals and a second pickling acid solution containing both hydrochloric acid and sulfuric acid;
   separating said ferrous sulfate heptahydrate crystals from second pickling acid solution.

2. The method according to claim 1, wherein said spent pickling acid solution also contains inhibitor additives, wherein at least some said inhibitor additives remain inert in said regeneration solution and pass unaltered into said second pickling acid solution.

3. The method according to claim 1, wherein said step of adding sulfuric acid to said spent first pickling acid solution includes adding said sulfuric acid in excess of a stoichiometric amount.

4. The method according to claim 1, further including the step of adding ions to said regeneration solution to balance ions within said regeneration solution to favor the formation of ferrous sulfate heptahydrate.

5. The method according to claim 1, wherein said step of cooling said regeneration solution includes cooling said regeneration solution to a temperature between zero degrees and forty degrees Fahrenheit.

6. The method according to claim 1, wherein said step of separating said ferrous sulfate heptahydrate crystals from second pickling acid solution includes subjecting said ferrous sulfate heptahydrate crystals and said second pickling acid solution to a centrifuge.

7. A method of pickling a ferrous metal, comprising the steps of:
- contacting said ferrous metal with a first pickling acid solution that contains hydrochloric acid in a pickling tank for a time sufficient to provide pickling and creating ferrous chloride within said first pickling acid solution;
- removing said first pickling acid solution from said pickling tank;
- adding a sulfuric acid to said first pickling acid solution to produce a regeneration solution;
- maintaining said regeneration solution at ambient pressure while said sulfuric acid reacts with said ferrous chloride within said first pickling acid to produce ferrous sulfate and a second pickling acid solution; and
- substituting said second pickling acid solution for said first pickling acid solution in said pickling tank.

8. The method according to claim 7, further including the step of cooling said regeneration solution to a temperature range of between zero degrees Fahrenheit and forty degrees Fahrenheit.

9. The method according to claim 7 further including adding inhibitors additives to said first pickling acid solution.

10. The method according to claim 9, further including the step of maintaining at least some of said inhibitor additives within said regeneration solution, wherein said at least some of said inhibitor additives pass into said second pickling acid solution.

11. The method according to claim 7, wherein said step of adding sulfuric acid to said first pickling acid solution includes adding said sulfuric acid in excess of a stoichiometric amount.

12. The method according to claim 7, further including the step of adding ions to said regeneration solution to balance ions within said regeneration solution to favor the formation of ferrous sulfate heptahydrate.

13. The method according to claim 7, further including the step of separating said ferrous sulfate from said second pickling acid solution by subjecting said ferrous sulfate and said second pickling acid liquor to a centrifuge.

\* \* \* \* \*